July 12, 1949.  O. L. PETERSON  2,475,914
FISHING KIT BELT

Filed Dec. 9, 1946  2 Sheets-Sheet 1

Inventor
O. L. Peterson
By Knowles
Attorneys

July 12, 1949.  O. L. PETERSON  2,475,914
FISHING KIT BELT
Filed Dec. 9, 1946  2 Sheets-Sheet 2
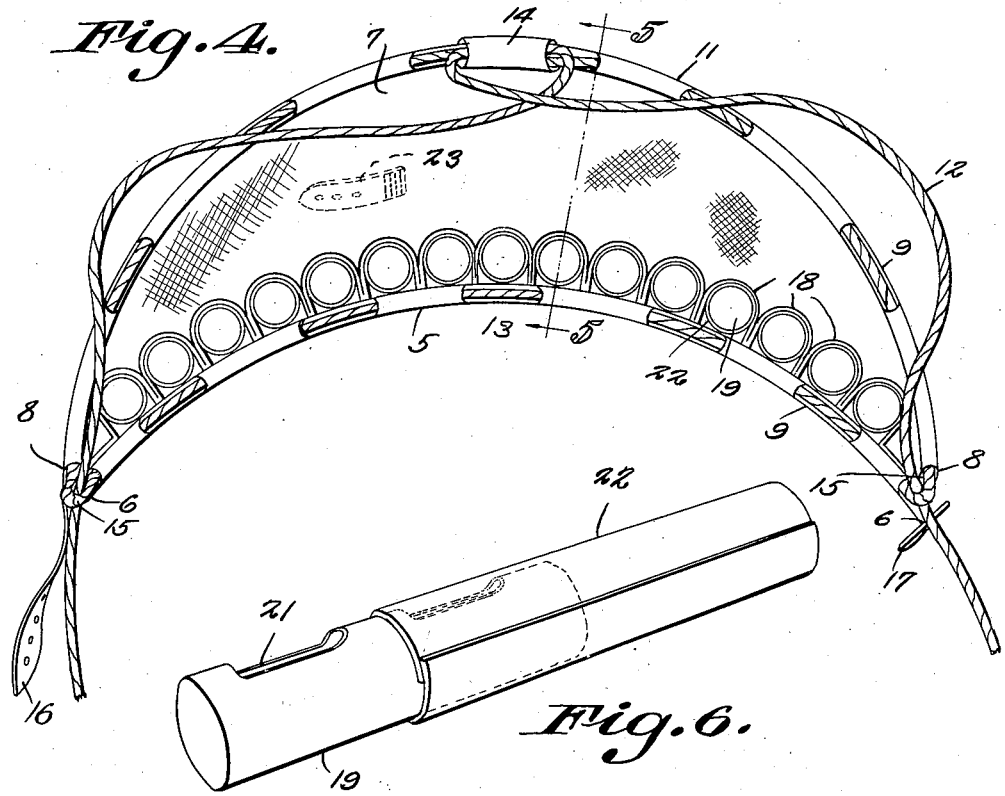
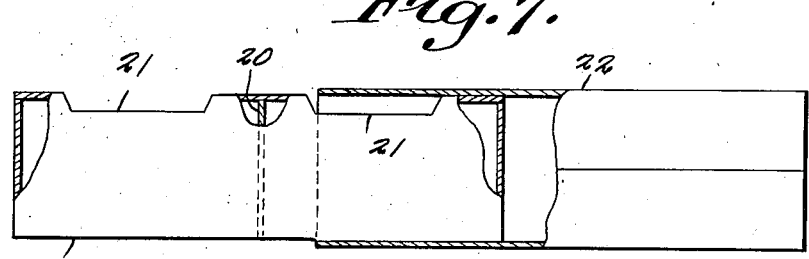
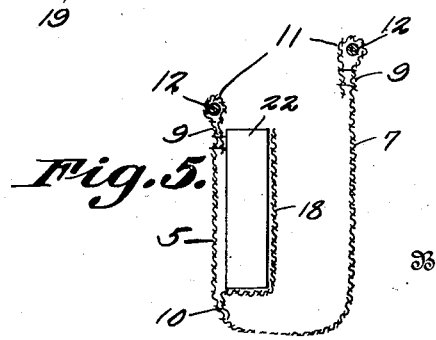
Inventor
O. L. Peterson
By  
Attorneys Patented July 12, 1949

2,475,914

UNITED STATES PATENT OFFICE 2,475,914

FISHING KIT BELT

Oscar L. Peterson, Prentice, Wis.

Application December 9, 1946, Serial No. 714,972

3 Claims. (Cl. 224—5)

This invention relates to fishing kit belts, the primary object of the invention being to provide a new and useful belt of this character which is capable of holding a large amount of bait and small equipment, and which is further capable of holding fish, thus fulfilling the functions of a fish creel.

It is an important object of the invention to provide a belt of the character described which will not interfere with the activity of the person wearing the belt, is easily adjustable to the physical proportions of the wearer, and is designed to prevent loss of bait or equipment, or fish carried in the belt.

It is a further object of the invention to provide a belt of this type which is foldable into a compact and easily carried article, when it is not being worn.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 4 is a top plan view.

Figure 5 is a view taken on line 5—5 of Figure 4.

Figure 6 is a perspective view of a bait and equipment container embodied in the invention, the container being shown in partly open position.

Figure 7 is a side elevational view of the container, shown partly in fragmentary longitudinal section.

Figure 1:
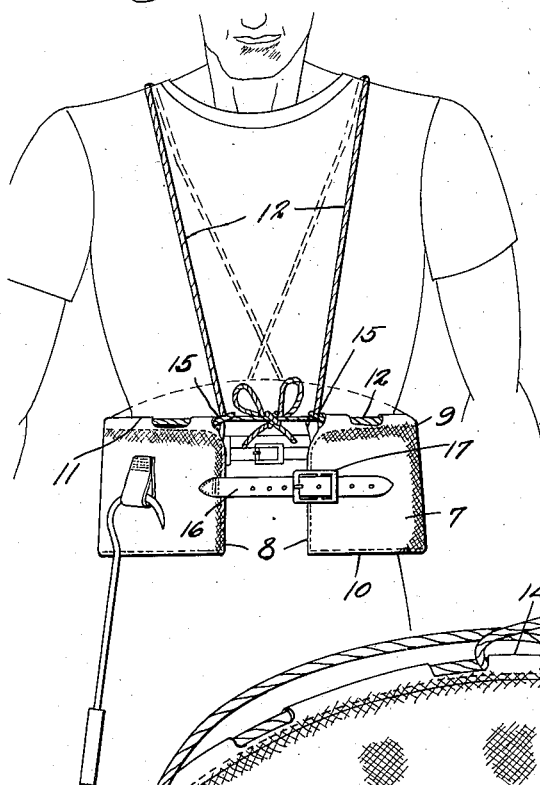
Figure 1 is a front elevation of a fishing kit belt constructed in accordance with the invention, and showing its application to the body of a person.

Referring to the drawing in detail, the invention embodies an inner belt portion 5 which is preferably of substantially rectangular conformation, and which may be formed of water-proofed canvas material or from other material possessing similar durable and water-repellent qualities. The belt portion 5 is adapted to fit around the waist of the user, the end edges 6 thereof being disposed forwardly, and spaced apart, when the belt is being worn, and adjustably connectable in a manner to be described more in detail hereinafter.

The invention further embodies an outer pouch portion 7 that is formed of material similar to that used in the belt portion 5, and which, in conjunction with the belt portion, provides a large pocket or pouch extending the entire length of the fishing kit belt. In order that this may be accomplished, the outer pouch portion 7 is of greater length than the inner belt portion 5, and has its end edges 8 sewed or secured by similar means to the end edges 6 of the belt portion. When the belt portion 5 is drawn around the waist of the wearer, therefore, an opening is formed between the upper side edges 9 of the belt portion 5 and of the pouch portion 7. The lower-side edges 10 of the belt and pouch portions are secured similarly to their side edges, forming a large pouch between these portions. By reference to Figure 5, it will be observed that the pouch portion 7 is of sufficient width between its upper and lower side edges to provide a bottom for this pouch, and it is pointed out that this width will naturally be tapered toward either side edge 8 to avoid bunching, and to guarantee a well-formed pouch.

Loops 11 are provided along the upper side edges of the belt portion 5 and pouch portion 7 for receiving a cord 12. This cord 12, in being properly inserted in the loops 11, is held at a point intermediate its ends, which I have designated in Figure 3 at 13, one end being started from this point in one direction through the loops on the belt portion 5 and pouch portion 7, until it has been extended through a large loop 14 intermediate the end edges of the pouch portion 7. The other end is started at 13 in an opposite direction until it also has been extended through the large loop 14. The ends of the cord 12 are then crossed above the large loop 14 and extended through loops 15 formed between the cord 12 and the adjacent end loops on the belt portion 5 and pouch portion 7. To the end edges 8 of the pouch portion 7 are secured a strap 16 and a cooperating buckle 17 for holding the fishing kit belt tightly around the waist.

Figure 3:
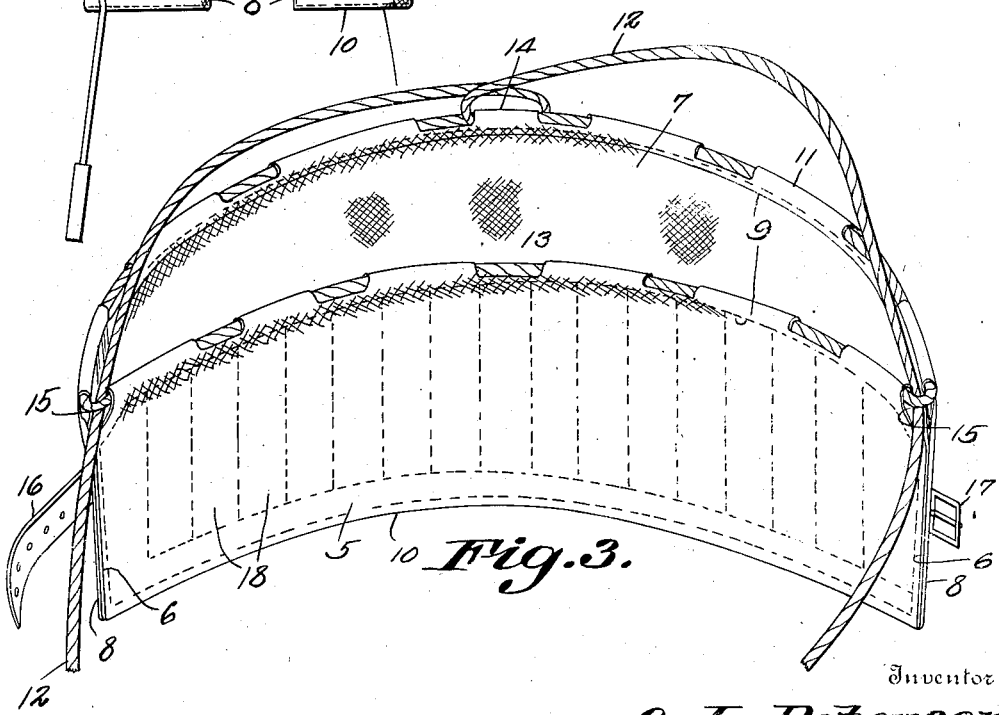
Figure 3 is a perspective view.

Pockets 18 are formed along the length of the belt portion 5 on the outer surface thereof, and may be formed by sewing the side and bottom edges of a rectangular piece of cloth material to the outer surface of the belt portion 5, forming one large pocket, and then sewing the piece to the belt portion vertically at spaced intervals, forming a plurality of pockets 18 of desired size, as may be clearly seen by referring to the dotted lines of Figure 3.

Insertable in the pockets 18 are containers for bait, lines, insect lotion, hooks, and other equipment. Each container comprises a cylindrical can or receptable 19 divided by a partition 20 into compartments provided with openings 21, and a cylindrical sleeve cover 22, which is open-ended, so that each compartment of the can 19 may be readily accessible.

Figure 2:
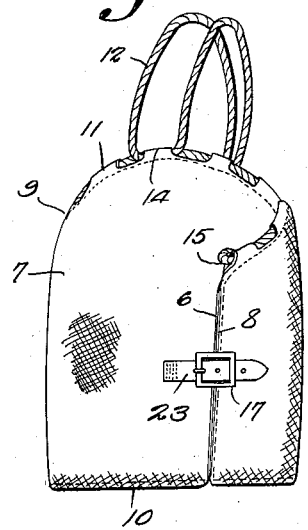
Figure 2 is an elevational view showing the belt as it appears when folded and ready to be carried.

When not being worn, the fishing kit belt which I have devised is adapted by its construction to be folded compactly and to be easily carried by handles, as is clearly shown in Figure 2. In order that this may be done, there is provided on the outer side of the pouch portion 7, approximately intermediate the end edges 8 thereof, a strap 23, the belt being folded or rolled transversely in order that the strap 23 may be connected to the buckle 17. The cord 12 provides handles which may be made of any desired length, so that the folded belt may be held by the user's hand or the cord 12 may alternatively be adapted to swing the folded belt from the shoulder.

When the belt is being worn, a gaff hook for larger fish may be carried thereby in an elastic loop 24 secured to the outer side of the belt portion 5.

In use, the belt is adjustably secured around the waist of the user by means of the strap 16 and buckle 17, the ends of the cord 12 being tied together above the strap and buckle, as is clearly shown in Figure 1. When this has been accomplished, the opening into the pouch formed between the belt portion 5 and pouch portion 7, is narrowed, and may be kept closed by suitable adjustment of the cord 12.

In obtaining a particular equipment container desired, the ends of the cord are loosened, and the belt readily turned on the waist of the user until access can be had to the particular pocket 18 in which the container is carried.

The pouch hereinbefore described serves the function of a creel, and fish may be retained therein without interference with further angling, since the greatest portion of the pouch extends across the user's back. It will be seen, in fact, by reason of the novel construction of my fishing kit belt, that while the belt is adapted to hold all the small items of equipment carried by the fisherman, and is adapted further to serve as a creel, interference with the fisherman's operations is held to a minimum. At the same time, bait containers and fish held by the belt are not easily lost, since the construction of the invention is adapted to close the pouch while the belt is being worn, with, however, sufficient elasticity to open it for inserting fish or for obtaining a container.

The construction which I have embodied in my invention further permits its ready use as a game and cartridge belt, since the pouch may serve to retain small game, and the pockets 18 may hold cartridges or other equipment.

What is claimed is:

1. A fishing kit belt comprising an elongated flexible pouch adapted to extend around a wearer's waist, said pouch being formed with a closed bottom and ends but being wholly open at its top to provide a mouth extending from end to end of the pouch, loops spaced around the edge of the mouth, and a cord extended through the loops and adapted to be passed over the shoulders of a wearer, the ends of the cord being extended through loops at the ends of the pouch, said ends being adapted, when drawn together with the pouch extended around the wearer's waist, to close the mouth of the pouch.

2. A fishing kit belt comprising an elongated pouch of flexible material adapted for extension around the waist of a wearer, said pouch being closed along its lower and end edges only, the upper edge of the pouch having spaced loops disposed completely therearound, and a single cord extended through the loops, the cord being extended out of loops disposed medially of the pouch and adapted to be passed over the shoulders of a wearer, the ends of the cord being extended through loops at the ends of the pouch and adapted when drawn together to close the pouch and retain it in position around the wearer's waist.

3. A belt comprising an elongated flexible pouch adapted for extension around the waist of a wearer, said pouch being open at its top from end to end thereof, and a cord surrounding the open top of the pouch and adapted for extension over the shoulders of a wearer, the ends of the cord passing through looped portions of the cord disposed at the ends of the pouch, whereby to close the open top of the pouch when said ends of the cord are drawn together to support the pouch to the waist of a wearer.

OSCAR L. PETERSON.

REFERENCES CITED

The following references are of record in the file of this patent:

UNITED STATES PATENTS

| Number | Name | Date |
|---|---|---|
| 243,363 | Crouch | June 28, 1881 |
| 1,340,077 | Orr | May 11, 1920 |

FOREIGN PATENTS

| Number | Country | Date |
|---|---|---|
| 423,627 | Great Britain | Feb. 5, 1935 |